Figure 1:
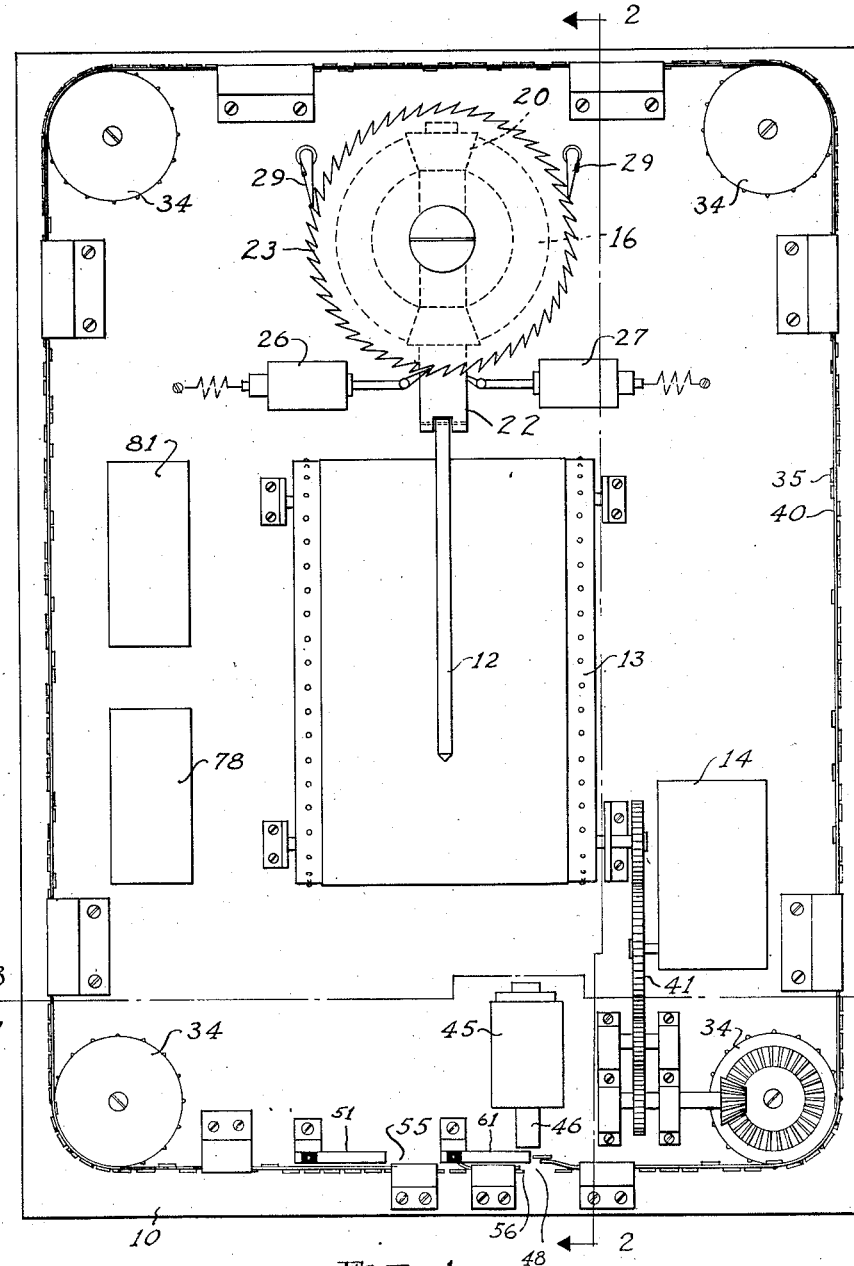

Nov. 18, 1947.  C. E. KLAUS  2,431,125
DEMAND METER
Filed June 28, 1944  4 Sheets-Sheet 1

INVENTOR.
C. E. Klaus
BY
ATTORNEY

Nov. 18, 1947.  C. E. KLAUS  2,431,125
DEMAND METER
Filed June 28, 1944  4 Sheets-Sheet 2

INVENTOR.
C. E. Klaus
BY
ATTORNEY

Nov. 18, 1947.   C. E. KLAUS   2,431,125
DEMAND METER
Filed June 28, 1944   4 Sheets-Sheet 3
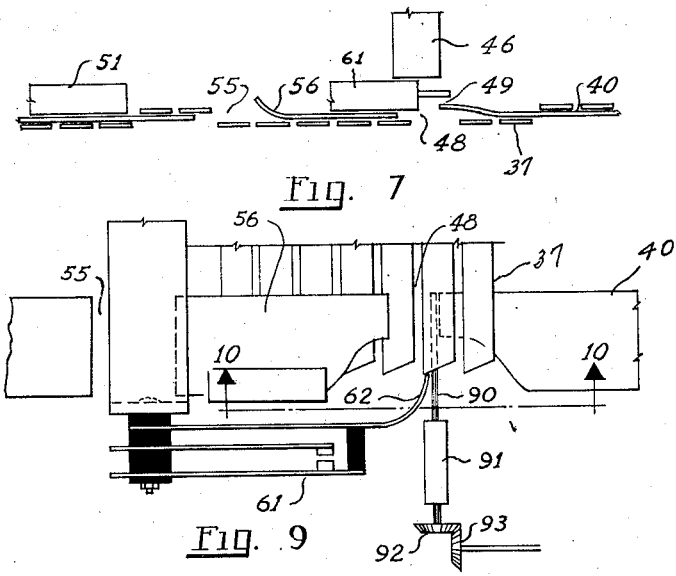
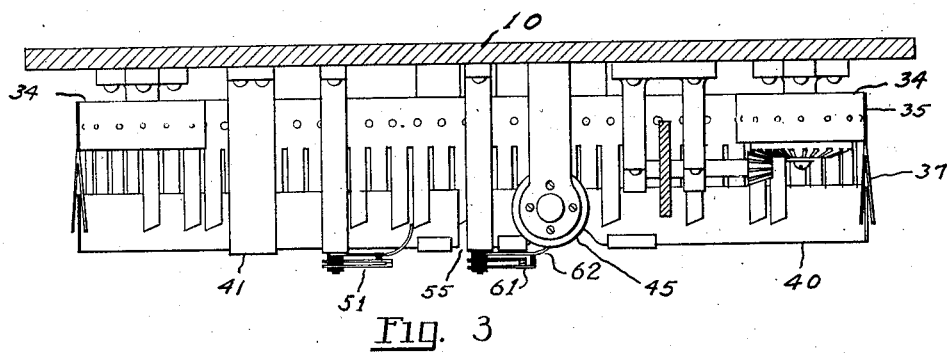
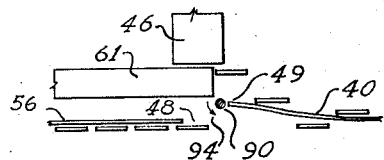
INVENTOR.
C. E. Klaus
BY
ATTORNEY Patented Nov. 18, 1947

2,431,125

UNITED STATES PATENT OFFICE 2,431,125

DEMAND METER

Charles E. Klaus, Portland, Oreg.

Application June 28, 1944, Serial No. 542,528

6 Claims. (Cl. 171—34)

The present invention relates to demand meters and more particularly to meters for measuring and recording average values of variable quantities such as power loads of electrical systems.

In the determination of load characteristics of an electrical system for rate classification and other purposes recording demand meters are frequently employed to obtain a record of the system demand at various times. Demand meters most commonly used are of the block interval or periodic type, that is, they plot indicia representing the block of energy consumed within a relatively short, fixed period of time of the order of twenty or thirty minutes. Since the indicator element is reset at the end of each such period, the indications are discontinuous, separate markings, each one representing the load demand condition of the preceding interval of time.

It is desirable, for numerous reasons, to provide a measuring instrument in which the indicator element at all times indicates the average value of the energy flow over the immediately preceding predetermined interval of time. Such an instrument would not miss peak loads which may happen to occur near the end of a time interval and thus be split between two intervals as in the case of the block interval type of indicating instrument. In addition to providing for greater accuracy, the chart record being in the form of a single continuous curve, is easy to read and interpret. Moreover, such type of indicator lends itself ideally for remote operation and is readily adaptable for automatic load control and the like purposes.

It is, therefore, an object of the present invention to provide a new and improved demand measuring apparatus having an indicator which at all times indicates the average value of energy flow over the immediately preceding interval of time.

A further object is to provide a new and improved demand meter which is adapted for recording an indication in the form of a continuous curve, each point of which curve represents the average power consumption of the immediately preceding predetermined period of time.

A further object of the invention is to provide a new and improved continuous curve recording demand meter which is accurate and dependable in operation, of simple design and comprising relatively few parts.

The demand meter of the present invention, according to the illustrated embodiment, comprises an indicator element, such as a pen for riding upon a moving chart, which element is driven through a differential drive unit by two separate actuating devices. One of these devices is periodically energized by a succession of electrical impulses such as may be provided by a contact making watt-hour meter, to notch the drive unit in one direction. The meter includes a means for registering the impulses upon their occurrence, the registrations being made in such form that they are effective for reproducing the succession of impulses in the same sequential arrangement a predetermined period of time later for energizing the second actuating device for notching the drive unit in the reverse direction. The position of the indicator at all times is, therefore, determined by the total number of impulses occurring within the fixed period and, in the assumed case, any point on the curve formed by the indicator is representative of the average energy flow over the period of time immediately preceding the time of such point.

For a consideration of what is believed novel and inventive, attention is directed to the following description taken in connection with the accompanying drawings, while the features of novelty will be pointed out with greater particularity in the appended claims.

Figure 4:
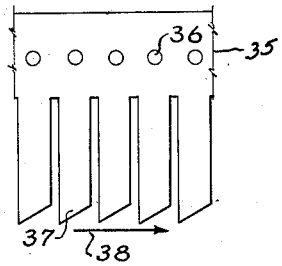
Figure 6:
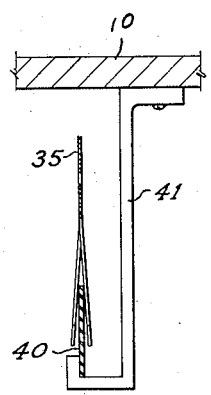
Figure 5:
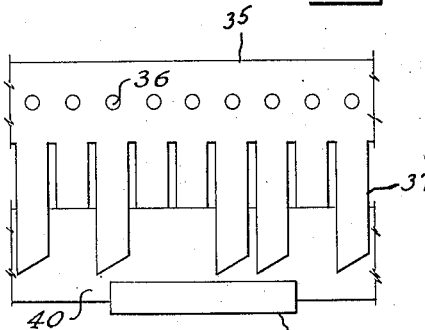
Figure 8:
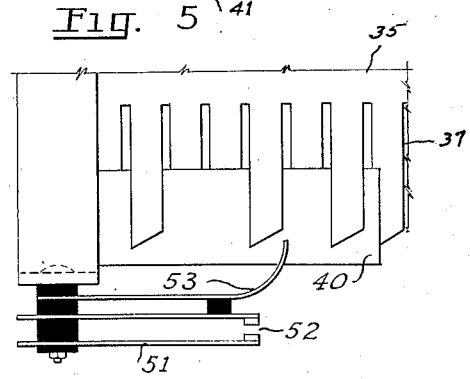
Figure 2:
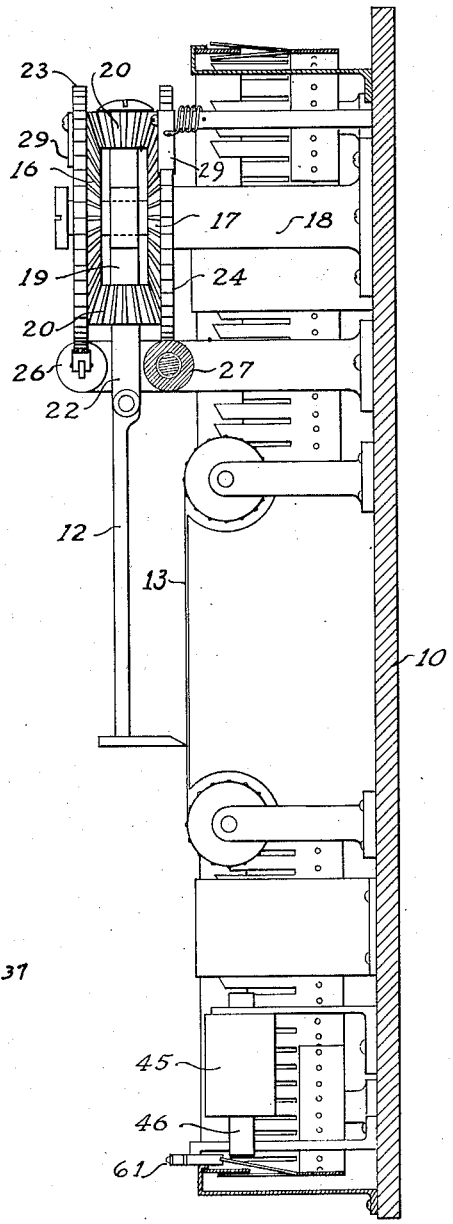
Figure 11:
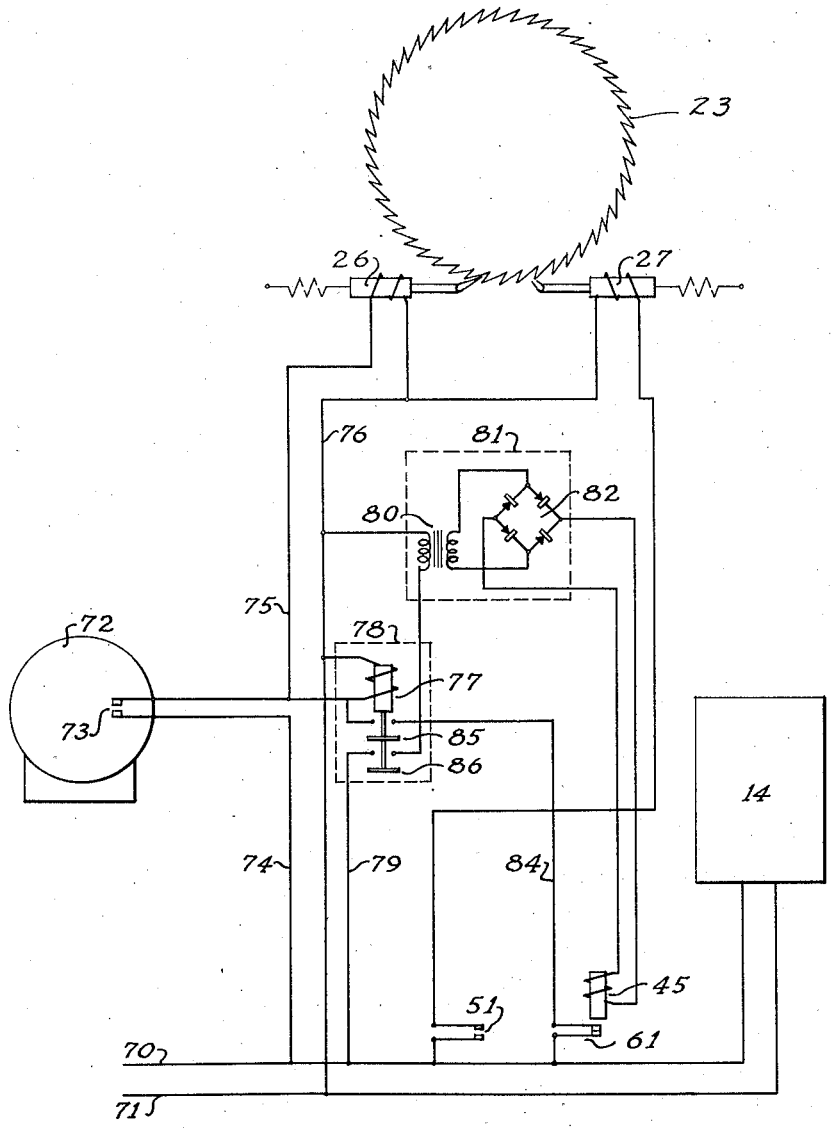

In the drawings Fig. 1 is a front elevation of the metering instrument constructed in accordance with the one form of the invention; Fig. 2 is a side view of the device taken along the line 2—2 of Fig. 1; Fig. 3 is a view taken along the line 3—3 of Fig. 1; Figs. 4, 5 and 6 are enlarged fragmentary views illustrating certain details embodied in the instrument; Fig. 7 is a diagrammatic sketch provided for describing certain details of the instrument; Fig. 8 is an enlarged fragmentary view illustrating the arrangement of one of the contact units of the instrument; Fig. 9 is an enlarged fragmentary view illustrating the arrangement of the contact unit beneath the electromagnetic actuating device; Fig. 10 is a view taken along the line 10—10 of Fig. 9, and Fig. 11 is a wiring diagram illustrating the electrical connections for the instrument.

Referring to the drawing, Figs. 1 and 2, 10 is a base panel upon which the various parts of the instrument are mounted, including an indicator element 12, which in this instance may be in the form of a pendulum type swinging arm supporting a recording pen at the lower end thereof arranged in cooperative relation with respect to a movable chart 13. The chart may be of the roll type supported upon suitable end rollers and driven by a motor 14 preferably of the synchronous variety.

The indicator element 12 is positioned by means of a differential drive unit comprising a pair of sun gears 16 and 17 supported co-axially upon the mounting pedestal 18 and an intermediate shaft element 19 having thereon a pair of planetary gears 20 meshed with the sun gears. The indicator element 12 is mounted upon the extension 22 of the shaft 19. Secured to the outer sides of the sun gears 16 and 17 are discs 23 and 24, respectively, each of which is provided with ratchet teeth on their periphery. The discs 23 and 24 are adapted to be actuated, or notched, in opposite directions of rotation in a step by step manner by electromagnetically operated notching devices 26 and 27 cooperatively arranged adjacent to the corresponding discs. The actuating devices 26 and 27 may be of any suitable form and, for ease of illustration, are shown as consisting of fixed coil elements and movable armature elements spring biased away from the associated discs. Upon energization of the devices by electric current impulses the armatures are extended to drive the associated disc forward one notch. Reverse rotation of the disc elements is precluded by suitable pawls 29 arranged in engagement therewith. The actuating devices 26 and 27 in driving the discs 23 and 24 in opposite directions will effect a movement of the indicator element 12 proportional to a differential of the number of actuations of the two devices. If the two devices 26 and 27 are energized in unison then the indicator element 12 will remain stationary and, conversely, if only one of the devices is actuated, then the indicator 12 will move in a corresponding direction by a proportional amount.

For deriving an indication of an average value of a variable quantity, over a predetermined period of time, then, one of the actuating devices may be periodically energized in accordance with a first succession of electrical impulses corresponding to measured units of the variable quantity. If the second actuating device be energized with a succession of impulses in the same sequential arrangement and time spacing as the original impulses but delayed for a predetermined period of time with respect thereto, then the indicator element will at all times register accurately the summation or average of the impulses occurring only within the predetermined period of time preceding any instantaneous position. It will become obvious, as the description proceeds, that the instrument of the present invention is not necessarily to be limited for providing an indication of demand for an electrical system but may equally well be used for providing demand indications of any form of energy, or gaseous or liquid flow.

The actuating device 26, which will hereinafter be referred to simply as the additive relay is, in this instance, adapted to be connected for periodic energization by a first succession of energizing impulses provided by a contact making watt-hour meter in response to measured unit quantities of power flow in an electrical system. The second actuating device 27, which will hereinafter be referred to as the subtractive relay, is connected for periodic energization by a second succession of impulses identical with the original impulses but delayed with respect thereto by a predetermined period of time. Simultaneously with the energization of periodic intervals of the additive relay 26, the succession of electrical impulses as created by the watt-hour meter is registered by a mechanism, which will be more fully described hereinafter, in the same relative order and spacing as their occurrence. The impulse registering mechanism is capable of reproducing the registrations in the form of a second succession of impulses substantially similar in number and spacing to the first succession of impulses but delayed for a predetermined period of time with respect thereto. This second succession of impulses impressed upon the subtractive relay 27 energizes it at periodic intervals to effect notching of the disc 24 of the differential unit in a direction opposite to that of the disc 23. The recording pen will therefore be caused to assume a position which may be calibrated in terms of total quantity of energy consumption for the predetermined period, that is kwh., or average rate of energy flow for the predetermined period, kw.

The impulse registering mechanism is comprised essentially of a longitudinal element which is maintained in constant lengthwise motion and is adapted for receiving an impression thereupon as it passes a particular point simultaneously with the occurrence of each of the electrical impulses. The particular form of the impression created upon the element, will of course depend upon the form of the element itself. If the element is in the form of a long, narrow paper strip then the impression may be in the form of a perforation through the strip or if the element is in the form of a steel wire the impressions may be in the form of magnetized sections, or further, the element may be in the form of a long perforated tape, the perforations being adapted for receiving small steel balls as markers. As illustrated in the drawings, however, the register element is in the form of an endless belt or web 35 extending around the instrument panel adjacent the outer edge thereof and trained over a series of sprocket pulleys 34 arranged at the four corners of the panel 10.

The belt or web 35, in this instance, is of a magnetic material and relatively thin and flexible and, is furthermore cut and perforated as shown more clearly in the enlarged fragmentary detailed view of Fig. 4. The steel web is relatively wide and is provided with a series of perforations 36 adjacent one edge which perforations mesh with the cooperating teeth provided on the various sprocket pulleys. The web is slotted transversely from the edge opposite the perforations 36 providing a multiplicity of relatively closely spaced, narrow, flexible fingers 37, the outermost ends of which fingers are cut at an angle so as to provide a sloping edge surface facing in the direction of travel as indicated by the arrow 38. The web 35 is adapted to be constantly driven and, for example, the motor 14 may be connected through gearing 41 to the adjacent pulley sprocket for driving the web at a rate of speed corresponding with the rate of travel and marking chart of the record 13.

A suitable means may be arranged adjacent the web 35 for engaging and effecting a displacement of one of the flexible fingers 37 simultaneously with the occurrence of each electrical impulse to be registered. If all of the fingers so acted upon are maintained in the displaced condition throughout a predetermined length of travel of the web and if such displaced fingers are caused to actuate a contact device also arranged adjacent the path of travel of the web a second succession of electrical impulses may be created which will correspond substantially identically in number and spacing between successive impulses to the original set of impulses as created by the watt-hour meter. This second succession of impulses, will be delayed with regard to the original impulses depending, however, upon the length of travel and speed of the web 35 and which, furthermore, may be adjusted to suit.

The fingers of the web 35 may readily be maintained divided into two groups, that is, those which have been offset or displaced with respect to the remainder so as to provide registrations of impulses, by supporting a dividing strip 40 adjacent the outer ends of the fingers and in an overlapping relation with respect thereto, as shown more clearly in the detail views Figs. 5 and 6. By reference to these views the dividing strip 40 is shown supported substantially in the plane of the web 35 by brackets 41, the brackets 41 being provided in such number as is required. At a particular point a gap is provided in the dividing strip 40 and the fingers approaching such gap will all lie on one side of the dividing strip. An actuating element may be arranged at this particular point and which may be connected for energization simultaneously with the occurrence of each one of the electrical impulses and when so energized it will engage or act upon the particular finger 37 which at that moment happens to be passing the gap in the dividing strip 40 and displace it to a position on the opposite side of the dividing strip 40 with respect to the remainder of the fingers 37. It will be obvious, however, that different means may be restorted to for effecting such displacement of the fingers. In accordance with the illustrated embodiment, and as previously stated, the web 35 or at least the fingers 37 thereof are of a magnetic material and hence are capable of being displaced electromagnetically. By reference to Fig. 1 and the diagrammatic detail view of Fig. 7 an electromagnetic actuating device 45 is suitably mounted adjacent the web 35 at the bottom of the instrument panel, the pole 46 of the electromagnetic element extending at right angles with respect to the web 35 and adjacent the outer ends of the fingers 37. The pole 46 of the electromagnet is arranged directly above a gap 48 in the dividing strip 40, the beginning edge of the strip being indicated more specifically at 49. Prior to their approach to the gap 48 all of the fingers 37 of the web are shifted to the side of the dividing strip opposite to the electromagnetic device 45 and 46. The winding of the electromagnet 45 may be connected in parallel with the energizing source of the additive relay 26 whereby upon each energization thereof one of the fingers 37 which happens to be directly beneath the gap 48 at that particular moment will be drawn up through the gap to the opposite side of the leading edge portion 49 of the dividing strip. In the operation of the instrument it will be seen that a succession of different fingers 37 will be displaced from one side of the division strip to the other as they pass beneath the electromagnetic actuating device 45 and which displaced fingers will represent impressions or registrations corresponding identically in number and frequency to the initial succession of impulses. The displaced fingers are maintained in such segregated relation from the remaining fingers by the dividing strip 40 which is coextensive with the web 35 from the beginning edge 49 around the three complete sides of the panel to a point at the bottom of the panel to the left of the electromagnetic device 45, as viewed in Fig. 1, at which point there is arranged a contact device and which is adapted to be engaged by each of the fingers of the web 35 which have been offset by the electromagnet 45. Any suitable form of contact device may be provided such as that shown in the enlarged detail view of Fig. 8 and indicated generally at 51. This device comprises a pair of normally open contacts 52 and a spring finger 53 mechanically associated therewith, the end of which finger extends into the path of movement of the ends of the fingers 37. By virtue of the sloping edge surfaces of the finger ends a somewhat sliding action occurs between the tips of the fingers 37 and the spring finger 53. After the displaced fingers 37 pass the contact device 51 they drop through the gap 55 in the division strip 40 and return into the plane of the web 35 including those fingers which were not displaced and pass under the short strip portion 56 immediately ahead of the gap 48 which was previously referred to.

The gap between the end of the guide strip 56 and the beginning edge of the dividing strip 40 is of a width just slightly greater than the distance between a pair of the successive fingers. In order, however, to insure that a finger is invariably picked up upon the occurrence of each impulse from the watt-hour meter provision is made in the control circuit for the electromagnet 45 to maintain the energization thereof following the occurrence of a single impulse and which energizing circuit is not broken until a finger has been picked up and safely segregated. This is of considerable importance due to the possibility of an impulse occurring at such an instant of time as when two adjacent fingers may have their opposite edge portions lying beneath the adjacent end edges of the guide 56 and end 49 of the strip 40. A contact device 61 is suitably supported adjacent the gap 48 having a spring finger 62 extending in the vicinity of the ends of the fingers 37 which have been lifted by the electromagnet. The contact device 61 is so arranged that the normally closed contacts thereof are not opened until after one finger 37 has passed beyond the leading edge 49 of the partitioning strip 40. As the contacts of the device 61 are opened the energizing circuit for the electromagnet 45 is broken conditioning it for a subsequent re-energization from the watt-hour meter.

The arrangement of the contact device 61 and its associated spring finger 62 with relation to the gap 48 in the dividing strip beneath the core of the electromagnetic device 45 is more clearly shown in the enlarged detail view of Fig. 9. In Figs. 9 and 10 is illustrated a further modification of the invention consisting in the arrangement of a means for preventing the spring fingers 37 from becoming caught on the forward edge 49 of the dividing strip 40. In the event an impulse of the watt-hour meter occurs so as to effect energization of the electromagnet device 45 at the exact instant when the leading edge of a finger 37 is in perpendicular alignment with the edge 49 of the dividing strip 40 the finger will scrape against the edge 49 as it is lifted therepast under the influence of the magnetic field. The frictional resistance between the finger and the edge 49 might overcome the force of the magnetic pull and cause the finger to stop in contact with the edge 49 and since the web 35 is in constant motion the finger caught on the edge 49 might become bent or otherwise damaged before it is pulled free. To prevent such an occurrence a small knurled shaft 90 is suitably mounted by a bearing means indicated at 91 immediately forward of the edge 49 and in parallel alignment therewith. The shaft 90 has a gear 92 on the end thereof which may be connected through a driving gear 93 suitably connected to the motor 14 for continuous operation thereby. The knurled shaft 90 is continuously rotated in the direction as indicated by the arrow 94 in Fig. 10 so that in the event a finger being lifted by the electromagnet core 46 does not have sufficient clearance to pass freely upwardly through the gap it will upon engagement with the rotating shaft 90 be deflected downwardly beneath the dividing strip 40 whereupon the immediately following finger will be lifted instead.

Referring now to Fig. 11 the electrical circuit diagram for the instrument will be described. The instrument is adapted to be energized from a suitable source of supply, assumed in this case to be alternating current, by conductors 70 and 71. A watt-hour meter is indicated generally at 72 having a set of contacts 73 which are adapted to engage at periodic intervals such as upon unit consumption of energy. Upon closing of the contacts 73 an energizing circuit for the apparatus is established extending from the supply conductor 70 through line 74, contacts 73, line 75 through the additive relay 26 and return conductor 76 to the other side 71 of the source of supply. The coil 77 of an auxiliary relay indicated generally at 78 connected in parallel with the relay 26 is also energized which picks up its contact 86 to establish an energizing circuit through conductor 79 for a transformer 80 of direct current power supply indicated at 81. Across the secondary of the transformer is connected a dry rectifier unit 82 supplying a source of direct current to the winding of the electromagnet device 45. The previously described contacts 61 arranged beneath the electromagnet device 45 establish a holding circuit for the auxiliary relay 77 through conductor 84 upon the closure of the contact 85. The contact device 51 is shown connected in the circuit of the subtractive relay 27 which upon actuation to the closed position by the displaced fingers of the web 35 carried therepast periodically energizes the relay 27 with the delayed, or second succession of impulses. The synchronous motor 14 is also illustrated connected across the source of supply.

While the invention has been described in what is considered to be a preferred embodiment thereof it is desired that it be understood that the specific details shown are merely illustrative and that the invention may be carried out by other means. It is intended, therefore, in the present claims to cover all such variations and modifications as fall within the true spirit and scope of the invention.

I claim:

1. A device of the class described comprising a first actuating means adapted to be periodically energized by a succession of electrical impulses, a continuously driven belt having a multiplicity of similar flexible elements arranged along one edge thereof, means for offsetting one of said elements simultaneously with each energization of said first actuating means, a second actuating means, means actuated by said offset elements a predetermined period of time following the offsetting thereof for effecting energization of said second actuating means, and indicating means actuated oppositely by said two actuating means.

2. A device of the class described comprising a first actuating means adapted to be periodically energized by a succession of electrical impulses, a continuously driven belt of relatively flexible magnetic material, said belt being slotted transversely along one edge so as to provide a multiplicity of flexible fingers, electromagnetic means connected in parallel with said first actuating means for offsetting one of said fingers simultaneously with each energization of said first actuating means, a second actuating means, means actuated by said offset fingers a predetermined period of time following the offsetting thereof for effecting energization of said second actuating means, and indicating means actuated oppositely by said two actuating means.

3. A device of the class described comprising a first actuating means adapted to be periodically energized by a succession of electrical impulses, a continuously driven belt of relatively flexible magnetic material, said belt being slotted transversely along one edge forming a multiplicity of flexible fingers, electromagnetic means connected in parallel with said first actuating means for offsetting one of said fingers simultaneously with each energization of said first actuating means, means for maintaining the fingers so offset throughout a considerable length of travel of said belt, a second actuating means, means actuated by said offset fingers a predetermined period of time following the offsetting thereof for creating a second succession of electrical impulses similar to the first succession of impulses but delayed a predetermined period of time with respect thereto for energizing said second actuating means, and indicating means actuated oppositely by said two actuating means.

4. A device of the class described comprising a first actuating means adapted to be periodically energized by a succession of electrical impulses, a continuously driven web of relatively flexible magnetic material, said web being slotted transversely along one edge so as to provide a multiplicity of flexible fingers, electromagnetic means connected in parallel with said first actuating means and arranged adjacent said web for offsetting one of said fingers simultaneously with each energization of said first actuating means, means extending continuously along the path of travel of said web for maintaining said offset fingers separate from the remainder, a second actuating means, a contact element actuated by said offset fingers a predetermined period of time following the offsetting thereof for effecting energization of said second actuating means, and indicating means actuated oppositely by said two actuating means.

5. A device of the class described comprising a first actuating means adapted to be periodically energized by a succession of electrical impulses, a continuously driven web of relatively flexible magnetic material, said web being slotted transversely along one edge so as to provide a multiplicity of flexible fingers, an electromagnetic device connected in parallel with said first actuating means for offsetting one of said fingers from the normal plane of said web corresponding with each energization of said first actuating means, a dividing strip supported coextensively with said web along the outer ends of said fingers for maintaining the offset fingers from the remaining fingers of said web, a gap in said strip adjacent said electromagnetic means, means arranged adjacent the start edge of said dividing strip for precluding snagging of said fingers thereupon, a second actuating means, means actuated by said offset fingers a predetermined period of time following the offsetting thereof for effecting energization of said second actuating means, and indicating means actuated oppositely by said two actuating means.

6. A device of the class described comprising a unit adapted to be periodically energized by a succession of electrical impulses, a continuously driven elongated member having a multiplicity of similar flexible elements connected thereto, means for offsetting one of said elements simultaneously with each energization of said unit, a first actuating means adapted to be energized in accordance with each energization of said unit, a second actuating means, switch means actuated by said offset elements a predetermined period of time following energization of said first actuating means for effecting energization of said second actuating means, elongated means extending cooperatively adjacent said elongated member between said offsetting means and said switch means for engaging and maintaining the offset ones of said flexible elements in the offset condition, and indicating means actuated oppositely by said two actuating means.

CHARLES E. KLAUS.

REFERENCES CITED

The following references are of record in the file of this patent:

UNITED STATES PATENTS

| Number | Name | Date |
| --- | --- | --- |
| 1,094,439 | Hatfield | Apr. 28, 1914 |
| 1,764,340 | Oman | June 17, 1930 |
| 2,190,497 | Whitby et al. | Feb. 13, 1940 |
| 2,333,758 | Xenis et al. | Nov. 9, 1943 |

FOREIGN PATENTS

| Number | Country | Date |
| --- | --- | --- |
| 480,135 | Great Britain | Feb. 17, 1938 |